(12) United States Patent
Takanashi et al.

(10) Patent No.: US 8,140,263 B2
(45) Date of Patent: Mar. 20, 2012

(54) METHOD FOR DERIVING CONVERSION COEFFICIENT USED FOR SPECIFYING POSITION FROM VALUE DETECTED BY VARIOUS SENSORS, AND NAVIGATION APPARATUS

(75) Inventors: Hiroaki Takanashi, Kanagawa-ken (JP); Takahiro Kondoh, Kanagawa-ken (JP)

(73) Assignee: Victor Company of Japan, Limited, Yokohama (JP)

( * ) Notice: Subject to any disclaimer, the term of this patent is extended or adjusted under 35 U.S.C. 154(b) by 436 days.

(21) Appl. No.: 12/363,751

(22) Filed: Jan. 31, 2009

(65) Prior Publication Data

US 2009/0198444 A1    Aug. 6, 2009

(30) Foreign Application Priority Data

Jan. 31, 2008   (JP) ................. 2008-021718
Jan. 31, 2008   (JP) ................. 2008-021726
Oct. 27, 2008   (JP) ................. 2008-275748
Oct. 27, 2008   (JP) ................. 2008-275749

(51) Int. Cl.
    *G01C 21/00*   (2006.01)
(52) U.S. Cl. ............. 701/213; 701/200; 701/214
(58) Field of Classification Search ............ 701/200, 701/201, 214, 216, 301, 213
See application file for complete search history.

(56) References Cited

U.S. PATENT DOCUMENTS

| | | | | |
|---|---|---|---|---|
| 5,276,451 A | * | 1/1994 | Odagawa ............... 342/357.32 |
| 5,483,456 A | * | 1/1996 | Kuwahara et al. ............ 701/215 |
| 5,510,801 A | * | 4/1996 | Engelbrecht et al. ......... 342/457 |
| 5,512,904 A | * | 4/1996 | Bennett ................... 342/357.32 |
| 5,565,874 A | * | 10/1996 | Rode ............................ 342/457 |
| 5,606,506 A | * | 2/1997 | Kyrtsos ....................... 701/207 |
| 5,684,476 A | * | 11/1997 | Anderson .................... 340/988 |
| 5,686,925 A | * | 11/1997 | Maeda et al. ............ 342/357.57 |
| 5,724,044 A | * | 3/1998 | Tanaka ......................... 342/351 |
| 5,742,925 A | * | 4/1998 | Baba ............................ 701/221 |
| 5,796,613 A | * | 8/1998 | Kato et al. ................... 701/214 |
| 5,890,092 A | * | 3/1999 | Kato et al. ................... 701/216 |
| 6,338,022 B1 | * | 1/2002 | Shinmura et al. ............ 701/301 |
| 6,502,033 B1 | * | 12/2002 | Phuyal ........................ 701/214 |
| 2001/0016798 A1 | * | 8/2001 | Kodaka et al. .............. 701/301 |
| 2003/0204310 A1 | * | 10/2003 | Tanaka et al. ................ 701/216 |
| 2004/0230349 A1 | * | 11/2004 | Oshiro et al. ................... 701/1 |

(Continued)

FOREIGN PATENT DOCUMENTS

JP      H05-018777      1/1993

(Continued)

*Primary Examiner* — Gerald J. O'Connor
*Assistant Examiner* — Jonathan K Ng
(74) *Attorney, Agent, or Firm* — Venable LLP; Michael A. Sartori; Christopher Ma

(57) ABSTRACT

A position measuring unit measures measurement data including at least a movement velocity, an accuracy reduction index, and an azimuth on the basis of a signal received from a satellite. A determining unit for a distance determines validity of measurement data and determines whether to derive a distance conversion coefficient using the measurement data determined valid. When the deriving is determined, a distance conversion coefficient calculator derives a distance conversion coefficient. A determining unit for an angular velocity determines an effective range for an integration value of an output value from an angular velocity sensor over a predetermined period on the basis of a movement velocity included in measurement data, and determines whether to derive an angular velocity conversion coefficient on the basis of the effective range and the integration value of the output values over the predetermined period. When the deriving is determined, an angular velocity conversion coefficient calculator derives an angular velocity conversion coefficient.

8 Claims, 11 Drawing Sheets

U.S. PATENT DOCUMENTS

| | | | |
|---|---|---|---|
| 2005/0021229 A1* | 1/2005 | Lee et al. | 701/210 |
| 2006/0025921 A1* | 2/2006 | Jung et al. | 701/201 |
| 2007/0239347 A1* | 10/2007 | Watanabe et al. | 701/200 |
| 2010/0332135 A1* | 12/2010 | Toda | 701/216 |

FOREIGN PATENT DOCUMENTS

| | | |
|---|---|---|
| JP | 07-055480 | 3/1995 |
| JP | H08-313279 | 11/1996 |
| JP | H09-152341 | 6/1997 |
| JP | 11-304507 | 11/1999 |
| JP | 2001-324560 | 11/2001 |
| JP | 2004-239881 | 8/2004 |
| JP | 2006-064593 | 3/2006 |

* cited by examiner

FIG.3

| ELEMENT NUMBER 200 | HDOP 202 | NUMBER OF SATELLITES 204 | GPS VELOCITY (m/s) 206 | DISPERSION OF ANGULAR VELOCITY 208 | NUMBER OF PULSES 210 | VALIDITY 212 |
|---|---|---|---|---|---|---|
| 1 | 0.8 | 6 | 16.7 | 1.2 | 45 | VALID |
| 2 | 0.8 | 6 | 16.5 | 1.5 | 45 | VALID |
| 3 | 0.9 | 7 | 16.6 | 0.8 | 45 | VALID |
| 4 | 0.8 | 7 | 16.6 | 1.0 | 45 | VALID |
| 5 | 0.8 | 6 | 16.5 | 1.1 | 45 | INVALID |
| 6 | 0.9 | 7 | 16.4 | 0.8 | 44 | INVALID |
| 7 | 7.1 | 3 | 16.3 | 1.5 | 44 | INVALID |
| 8 | 9.0 | 3 | 15.9 | 1.3 | 43 | INVALID |

30

METHOD FOR DERIVING CONVERSION COEFFICIENT USED FOR SPECIFYING POSITION FROM VALUE DETECTED BY VARIOUS SENSORS, AND NAVIGATION APPARATUS

CROSS-REFERENCE TO RELATED APPLICATIONS

The present application claims the priority benefit of Japanese patent application numbers JP 2008-021718 filed Jan. 31, 2008; JP 2008-021726 filed Jan. 31, 2008; JP 2008-275748 filed Oct. 27, 2008; and JP 2008-275749 filed Oct. 27, 2008. The disclosure of each of the aforementioned application is incorporated herein by reference.

BACKGROUND OF THE INVENTION

1. Field of the Invention

The present invention generally relates to technology for deriving a conversion coefficient. More particularly, the present invention relates to a method for deriving a conversion coefficient used for specifying a position from a value detected by various sensors, and a navigation apparatus.

2. Description of the Related Art

A navigation apparatus for a vehicle generally estimates an optimum position by synthesizing a position calculated from self-contained navigation and a position calculated from a global positioning system (GPS). The self-contained navigation also calculates a current position by updating a previous measured position on the basis of a speed pulse representing the speed of a vehicle and a turning angular velocity of a vehicle measured by an angular velocity sensor, i.e. a gyro. According to this type of navigation apparatus, it is possible to derive the position of a user's car using self-contained navigation even in a tunnel, an underground parking lot, or between skyscrapers where reception of a radio wave from a GPS satellite is difficult. However, in this case, it is required that a movement distance from a speed pulse and an angular velocity from a gyro (i.e., an azimuth) is accurately obtained.

To accurately obtain a movement distance of a vehicle, it is preferable that a movement distance per unit pulse (hereinafter referred to as a "distance conversion coefficient") is accurate. The distance conversion coefficient is generally different depending on a change in a weight of a vehicle or abrasion of a tire. Accordingly, the distance conversion coefficient is calculated from a speed pulse and a distance or a speed derived from a GPS. To accurately obtain a turning angular velocity of a vehicle, it is also preferable that an angular velocity per unit output (hereinafter referred to as an "angular velocity conversion coefficient") of an angular velocity sensor, and an output (hereinafter referred to as an "offset") when an angular velocity is "0" are accurate. Generally, the angular velocity conversion coefficient is different depending on a deviation of an individual angular velocity sensor or a mounting angle at which an angular velocity sensor is mounted on a vehicle. There is also the possibility that the offset changes depending on a temperature change. Accordingly, the angular velocity conversion coefficient is calculated from an output of the angular velocity sensor and an azimuth serving as a reference and obtained from a GPS. The offset is also calculated from an output of the angular velocity sensor during vehicle stoppage for example.

For example, a method for correcting a distance correction coefficient related to a distance conversion coefficient using a velocity measured in a GPS on the basis of a Doppler effect has been proposed. Since the method uses a velocity output from the GPS, that is, a movement distance per unit time, when a time width counting the unit time and a speed pulse is matched, a distance conversion coefficient is easily calculated as illustrated by Laid Open Japanese Patent Application No. 5-18777. However, in a GPS, a period for deriving a speed and a period for deriving a speed pulse are different from each other in general. To address this limitation, a method for calculating a distance conversion coefficient only in the case where a uniform velocity condition that a vehicle moves at a constant velocity is met has been proposed as illustrated in JP-A No. 8-313279. A method for correcting an angular velocity conversion coefficient using a difference between absolute azimuths in two adjacent straight intervals, and history of an angular velocity of a gyro is also provided. At this point, learning is being executed. The learning means performing, for example, an operation on an obtained angular velocity conversion coefficient each time, and gradually converging an angular velocity conversion coefficient in order to suppress a change by a noise. When there are many opportunities for matching with a condition for leaning and many angular velocity conversion coefficients can be obtained in a short time, converging of learning is fast as evidenced in JP-A No. 9-152341.

In the circumstance, of data output by a GPS, not only a movement velocity is delayed but also Horizontal Dilution of Precision (HDOP) representing deterioration of measurement position accuracy in the horizontal direction of a GPS, or the number of satellites is delayed. These data are used as indexes of determining whether a distance conversion coefficient or an angular velocity conversion coefficient (hereinafter referred to as a generic term of "conversion coefficient") can be calculated or not. Therefore, these data may have an adverse influence on an accuracy of determining whether to derive a conversion coefficient before and after a tunnel, for example. Meanwhile, to match with a uniform velocity condition, two straight line intervals with a curve intervening are required. Even when the condition is matched, since a conversion coefficient is updated only one time, converging is delayed.

SUMMARY OF THE INVENTION

The present invention has been made in view of the above-mentioned circumstances, and a purpose thereof is to provide technology for improving an accuracy of determining whether to derive a conversion coefficient.

In one embodiment, there is provided a navigation apparatus for deriving a movement distance of a moving body on the basis of the number of pulses generated within a predetermined period accompanied with movement of the moving body, and a conversion coefficient from the number of pulses to a movement distance, the navigation apparatus including: a detector configured to detect the number of pulses; a measuring unit configured to measure, every measurement timing, measurement data including at least a movement velocity and an accuracy reduction index on the basis of a signal received from a satellite; a first determining unit configured to determine validity of measurement data at each measurement timing on the basis of measurement data measured at the measuring unit; a second determining unit configured to determine whether to derive the conversion coefficient using the measurement data determined valid at the first determining unit; and a deriving unit, when the derivation is determined at the second determining unit, configured to derive the conversion coefficient on the basis of a movement velocity of the measurement data measured at the measuring unit, and the number of pulses detected at the detector. The first determining unit reflects measurement data at a measurement timing that depends on a change of a period required for measuring the accuracy reduction index when determining validity of measurement data at a predetermined measurement timing.

According to this embodiment, since measurement data at a measurement timing that depends on a change of a period required for measuring the accuracy reduction index is also reflected when determining validity of measurement data at a predetermined measurement timing, a timing error between measurement data and the number of pulses by a change may be reduced.

The navigation apparatus may further include a controller configured to control an output timing of the number of pulses from the detector in order to match with a measurement timing of measurement data at the measuring unit, and configured to output the number of controlled pulses to the deriving unit. In this case, since the output timing of the number of pulses is controlled depending on an error between a detection timing of the number of pulses and a measurement timing of measurement data, an error between a detection timing and a measurement timing may be reduced.

In another embodiment, there is provided a navigation apparatus for deriving a movement distance of a moving body on the basis of the number of pulses generated within a predetermined period accompanied with movement of the moving body, and a conversion coefficient from the number of pulses to a movement distance, the navigation apparatus including: a detector configured to detect the number of pulses; a measuring unit configured to measure, every measurement timing, measurement data including at least a movement velocity and an accuracy reduction index on the basis of a signal received from a satellite; a first determining unit configured to determine validity of measurement data at each measurement timing on the basis of measurement data measured at the measuring unit; a second determining unit configured to determine whether to derive the conversion coefficient using the measurement data determined valid at the first determining unit; and a deriving unit, when the derivation is determined at the second determining unit, configured to derive the conversion coefficient on the basis of the movement velocity contained in the measurement data measured at the measuring unit, and the number of pulses detected at the detector. The deriving unit controls a detection timing of the number of pulses at the detector in order to match with a measurement timing of measurement data at the measuring unit, and then derives the conversion coefficient.

According to this embodiment, since an output timing of the number of pulses is controlled depending on an error between a detection timing of the number of pulses and a measurement timing of measurement data, an error between a detection timing and a measurement timing may be reduced.

In still another embodiment, there is provided a navigation apparatus including: a detector configured to detect the number of pulses generated within a predetermined period accompanied with movement of a moving body; a measuring unit configured to measure, every measurement timing, measurement data including at least a movement velocity and an accuracy reduction index on the basis of a signal received from a satellite; a controller configured to control a detection timing of the number of pulses at the detector in order to match with a measurement timing of measurement data at the measuring unit; a first determining unit configured to determine validity of measurement data at each measurement timing on the basis of measurement data measured at the measuring unit; a second determining unit configured to determine whether to derive the conversion coefficient from the number of pulses to a movement distance of the moving body using the measurement data determined valid at the first determining unit, and the number of pulses whose detection timing has been controlled at the controller; and a deriving unit, when the derivation is determined at the second determining unit, configured to derive the conversion coefficient on the basis of the movement velocity contained in the measurement data measured at the measuring unit, and the number of pulses whose detection timing has been controlled at the controller.

According to this embodiment, since whether to derive a conversion coefficient is determined using measurement data and the number of pulses whose detection timing has been controlled, an amount of processes for determination may be reduced.

In further another embodiment, there is provided a method for deriving a conversion coefficient, the method including: detecting the number of pulses generated within a predetermined period accompanied with movement of a moving body; measuring, every measurement timing, measurement data including at least a movement velocity and an accuracy reduction index of the moving body on the basis of a signal received from a satellite; determining validity of measurement data at each measurement timing on the basis of measured measurement data; determining whether to derive the conversion coefficient using the measurement data determined valid; and when the derivation is determined, deriving the conversion coefficient on the basis of the movement velocity contained in the measured measurement data, and the number of pulses detected. The determining validity includes, when determining the validity of measurement data at a predetermined measurement timing, reflecting measurement data at a measurement timing that depends on a change in a period required for measuring the accuracy reduction index.

In yet another embodiment, there is provided a method for deriving a conversion coefficient, the method including: detecting the number of pulses generated within a predetermined period accompanied with movement of a moving body; measuring, every measurement timing, measurement data including at least a movement velocity and an accuracy reduction index on the basis of a signal received from a satellite; controlling a detection timing of the number of pulses in order to match with a measurement timing of measurement data; determining validity of measurement data at each measurement timing on the basis of measured measurement data; determining whether to derive the conversion coefficient from the number of pulses to a movement distance of the moving body using the measurement data determined valid, and the number of pulses whose detection timing has been controlled; and when the derivation is determined, deriving the conversion coefficient on the basis of the movement velocity contained in the measured measurement data, and the number of pulses whose detection timing has been controlled.

In still further another embodiment, there is provided a navigation apparatus for deriving an angular velocity of a moving body on the basis of an output value of an angular velocity sensor provided to the moving body, and a conversion coefficient from the output value of the angular velocity sensor to an angular velocity, the navigation apparatus including: a measuring unit configured to measure measurement data including at least an azimuth of a movement direction and a movement velocity on the basis of a signal received from a satellite periodically; a decision unit configured to determine an effective range for an integration value of output values from the angular velocity sensor over a predetermined period on the basis of the movement velocity contained in the measurement data measured at the measuring unit; a determining unit, when the integration value of the output values from the angular velocity sensor over the predetermined period is not included in the effective range determined at the decision unit, configured to determine suspense of deriving of the conversion coefficient to determine whether to derive the conversion coefficient; and a deriving unit, when the derivation is determined at the determining unit, configured to derive the conversion coefficient on the basis of a difference in the azimuth of the movement direction for the predetermined period, and the integration value of the output values from the angular velocity sensor over the predetermined period, that are obtainable from measurement data measured at the measuring unit.

According to this embodiment, since whether to derive a conversion coefficient is determined using, as a reference, the effective range determined depending on a movement velocity, reduction in an opportunity of deriving a conversion coefficient may be suppressed, and simultaneously, an accuracy of determining whether to derive a conversion coefficient may be improved.

The decision unit may determine an effective range that seems narrow as the moving velocity decreases. In this case, since the effective range that seems narrow as the moving velocity decreases is determined, deterioration of a determination accuracy by a decrease of the moving velocity may be suppressed.

The navigation apparatus may further include a controller configured to control an output timing of an output value from the angular velocity sensor in order to match with a measurement timing of measurement data at the measuring unit, and configured to output the output value of the controlled angular velocity sensor to the determining unit and the deriving unit. In this case, since the output timing of the output value of the angular velocity sensor is controlled depending on an error between a detection timing of the output value of the angular velocity sensor and a measurement timing of measurement data, an error between a detection timing and a measurement timing may be reduced.

In still yet another embodiment, there is provided a method for deriving an conversion coefficient, the method including: periodically measuring measurement data including at least an azimuth of a movement direction and a movement velocity of a moving body on the basis of a signal received from a satellite; determining an effective range for an integration value of output values from the angular velocity sensor over a predetermined period on the basis of the movement velocity of measured measurement data; when the integration value of the output values from the angular velocity sensor over the predetermined period is not included in the determined effective range, determining suspense of deriving of a conversion coefficient to determine whether to derive the conversion coefficient; and when the derivation is determined, deriving the conversion coefficient on the basis of a difference in the azimuth of the movement direction for the predetermined period, and the integration value of the output values from the angular velocity sensor over the predetermined period, that are obtainable from measured measurement data.

Arbitrary combination of the above-described elements, and expression of the present invention in the form of conversion between a method, an apparatus, a system, a recording medium, a computer program, etc. may be also effective as an embodiment of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 3 is a view illustrating a structure of data used for the determining unit for the distance in FIG. 1;

DETAILED DESCRIPTION

Figure 1:
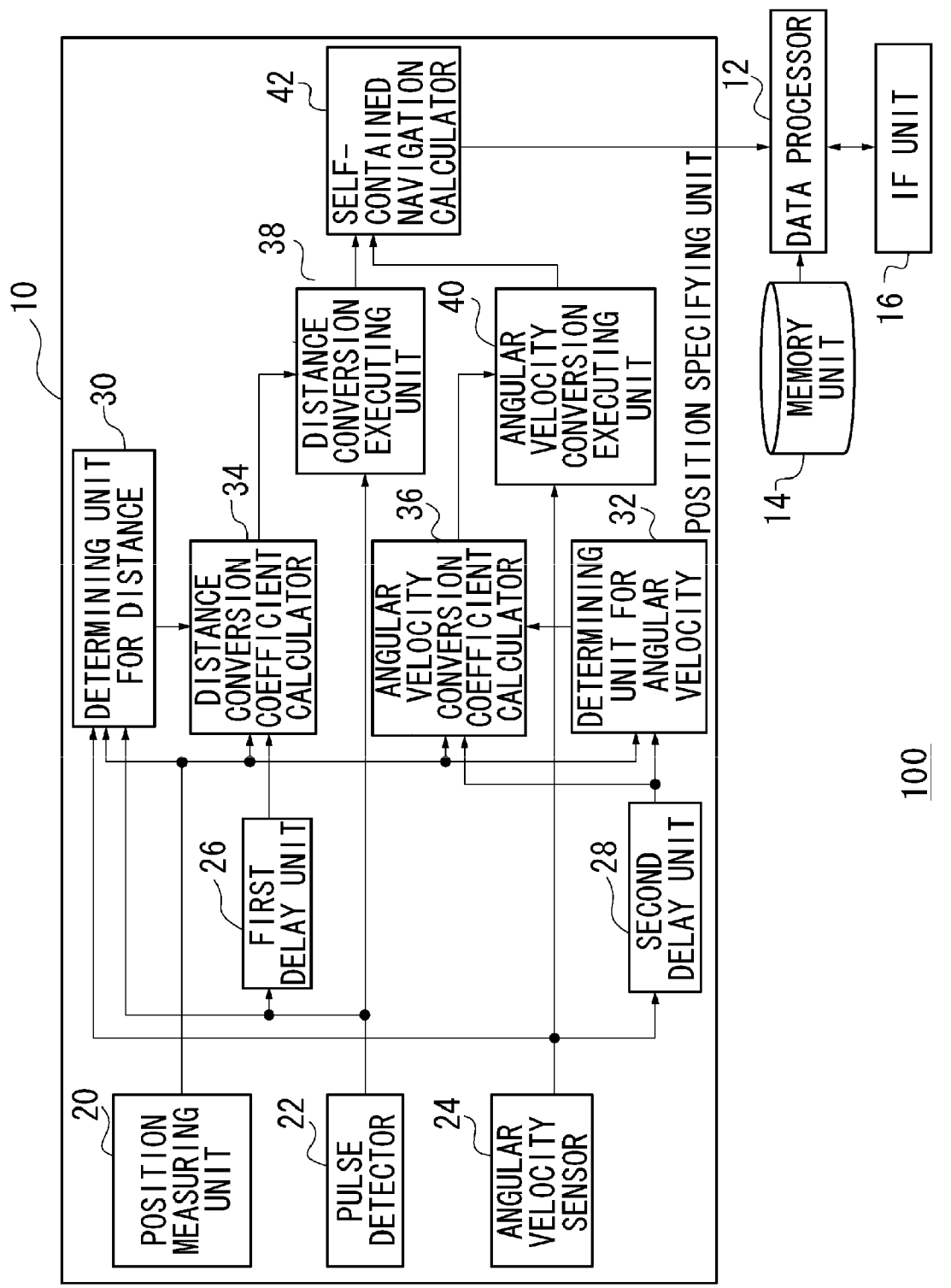
FIG. 1 is a view illustrating the construction of a navigation apparatus according to a first embodiment of the present invention.

The invention will now be described by reference to the exemplary embodiments.

First Embodiment

In a first embodiment, the present invention relates to a navigation apparatus mounted on a vehicle. The navigation apparatus specifies a current position by using a signal from a GPS satellite and performing self-contained navigation. Here, description is made mainly using the self-contained navigation. In the self-contained navigation, as described above, a movement distance is derived by multiplying a detected speed pulse by a distance conversion coefficient, and an azimuth is derived by multiplying a detected output value of an angular velocity sensor (hereinafter referred to as an "output value") by an angular velocity conversion coefficient. A current position is specified by updating a previous position on the basis of a movement distance and an azimuth.

To improve a specific accuracy of a position by the self-contained navigation, an accuracy of a conversion coefficient is required. Generally, when a distance conversion coefficient is derived, a speed pulse corresponds to measurement data measured on the basis of a signal from a GPS satellite. Here, the measurement data includes a movement velocity (hereinafter referred to as a "GPS velocity"), and a HDOP. A period required for measuring these values tends to be more than a period required for measuring a speed pulse. The period required for measuring the measurement data can change depending on a capture circumstance of a GPS satellite. To improve a deriving accuracy of a distance conversion coefficient under this circumstance, it is preferable the velocity pulse corresponds to the measurement data, with consideration of a change in the measurement period of the measurement data. It is also required to increase an opportunity of updating the angular velocity conversion coefficient. Meanwhile, when a measurement accuracy of the measurement data is used in the case where the measurement accuracy is low, the deriving accuracy of the angular velocity conversion coefficient is deteriorated. Therefore, it may be preferable to increase an updating opportunity and reduce use of measurement data having low measurement accuracy.

To address this limitation, a navigation apparatus according to the embodiment performs the following process. The navigation apparatus presents a change range of a measurement period when measuring velocity data, and sets a somewhat large change range as a window. The navigation apparatus allows all measurement data included in the window to correspond to a velocity pulse. As a result, even when a degree of a change is not specified, a velocity pulse is allowed to correspond to measurement data with consideration of an influence of the change. Meanwhile, the navigation apparatus determines an effective range for an output value, and uses an output value included in the effective range in deriving an angular conversion coefficient. Besides an output value, measurement data is used in deriving an angular conversion coefficient, but an accuracy of the measurement data has a tendency to increase when a movement velocity is high. Therefore, as the movement velocity gets high, the navigation apparatus reduces use of measurement data having low measurement accuracy, and increases an update opportunity by widening an effective range.

FIG. 1 illustrates a construction of a navigation apparatus 100 according to a first embodiment of the present invention. The navigation apparatus 100 of FIG. 1 includes a position specifying unit 10, a data processor 12, a memory unit 14, and an IF unit 16. The position specifying unit 10 also includes a position measuring unit 20, a pulse detector 22, an angular velocity sensor 24, a first delay unit 26, a second delay unit 28, a determining unit for a distance 30, a determining unit for an angular velocity 32, a distance conversion coefficient calculator 34, an angular velocity conversion coefficient calculator 36, a distance conversion executing unit 38, an angular velocity conversion executing unit 40, and a self-contained navigation calculator 42.

A position measuring unit 20 receives a signal from a GPS satellite (not shown). The position measuring unit 20 measures a GPS velocity, an azimuth, an HDOP, and the number of satellites on the basis of received signals. As described above, the measured GPS velocity, azimuth, HDOP, and number of satellites are generally called measurement data. The measurement data can include a value besides these values. Since the measurement data can be measured by a known art, description thereof is not repeated herein. For example, as described above, the GPS velocity can be derived by using the Doppler effect. The position measuring unit 20 measures the measurement data every measurement timing (i.e., periodically).

The pulse detector 22 is connected to a velocity sensor (not shown). The velocity sensor is installed in the intermediate portion of a speed meter cable rotating in response to rotation of a drive shaft, and outputs a speed pulse signal involved in the rotation of the drive shaft. The pulse detector 22 periodically detects the number of pulses by counting an output speed pulse signal accompanied with movement of a vehicle every predetermined period. For conciseness in description, it is assumed that a period detecting the number of pulses is a period of measurement timing. The angular velocity sensor 24, for example, corresponds to a gyro unit of a vibration gyro, and detects a change in a progression direction of a vehicle as a relative angle change of the vehicle. That is, the angular velocity sensor 24 detects a turning angular velocity of a vehicle. Here, a value output from the angular velocity sensor 24 is called an output value as described above. Since a known art can be used for the gyro unit, description thereof is not repeated herein.

The first delay unit 26 receives the number of pulses from the pulse detector 22, delays the number of pulses, and outputs the same. That is, the first delay unit 26 controls an output timing of the number of pulses, and outputs the number of controlled pulses. Here, a delay period at the first delay unit 26 is determined by an error between a detection timing in the number of pulses at the pulse detector 22, and a measuring timing in measurement data, particularly, a GPS velocity at the position measuring unit 20. Generally, a period for deriving the latter is longer than a period for deriving the former. The first delay unit 26 delays the number of pulses in order to reduce difference in a relative timing between them. A specific value of the delay period can be determined in advance by an experiment. A process of the first delay unit 26 is equivalent to controlling a detection timing of the number of pulses at the pulse detector 22.

The determining unit for a distance 30 determines whether to derive a distance conversion coefficient on the basis of measurement data from the position measuring unit 20, the number of pulses from the pulse detector 22, and an output value from the angular velocity sensor 24. When determining the deriving, the determining unit for the distance 30 orders the distance conversion coefficient calculator 34 to update a distance conversion coefficient. The determining unit for the distance 30 performs this determination in two processes. In a first process, the validity of measurement data at each measurement timing is determined on the basis of the measurement data. In a second process, whether to derive a distance conversion coefficient is determined using measurement data determined valid. A portion of the determining unit for the distance 30 corresponding to the first process can be called a first determining unit, and a portion corresponding to the second process can be called a second determining unit. Before these processes are described in detail, a timing and a data structure which are propositions of the processes are described herein.

Figure 2:
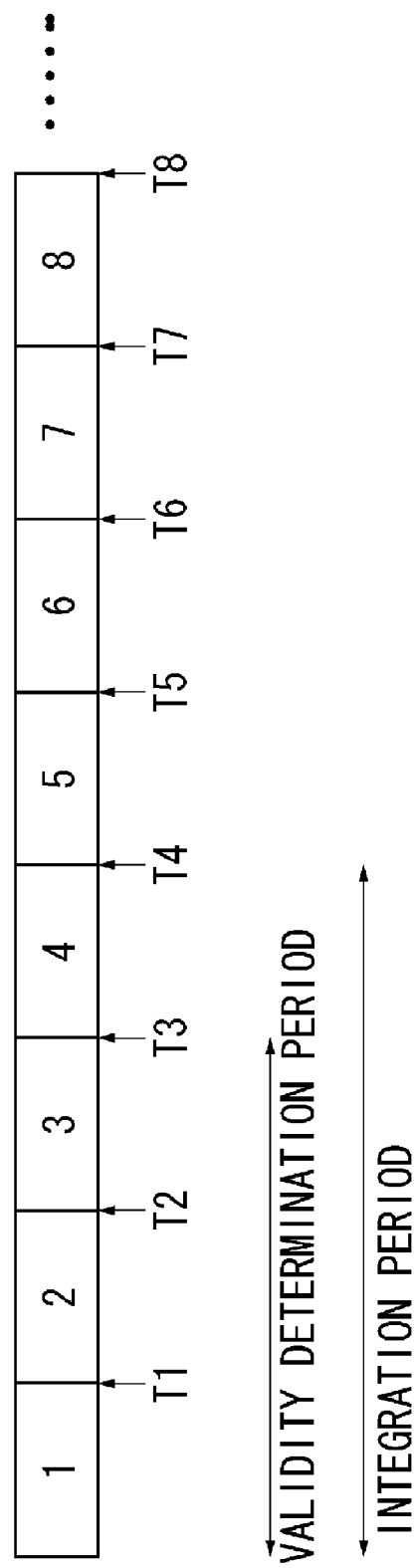
FIG. 2 is a view illustrating an outline of a process timing performed at the determining unit for the distance in FIG. 1.

FIG. 2 illustrates an outline of a timing of a process performed at the determining unit for the distance 30. In FIG. 2, "T1" to "T8" correspond to the measurement timing. An interval of an adjacent measurement timing is a constant value $\Delta T$. Here, measurement data received at measurement timing T1 is an element "1", and measurement data received at measurement timing T2 is an element "2". In another measurement timing, the elements are provided likewise. Though described in detail later, a period of integration (referred to as an "integration period" hereinafter) used for calculating a distance conversion coefficient is $4\Delta T$, and a period for determining the validity of measurement data (referred to as a "validity determining period" hereinafter) is $3\Delta T$. The detection timing can coincide with the measurement timing.

FIG. 3 illustrates a data structure used at the determining unit for the distance 30. As illustrated, data includes an element number column 200, an HDOP column 202, a number of satellites column 204, a GPS velocity column 206, an angular velocity dispersion column 208, a number of pulses column 210, and a validity column 212. The element number column 200 contains a number for identifying the element described in FIG. 2. The HDOP column 202 to the GPS velocity column 206 contain values included in measurement data. After a dispersion of output values of the angular velocity sensor 24 is derived, and the derived dispersion is contained in the angular velocity dispersion column 208. The determining unit for the distance 30 receives a plurality of output values during $\Delta T$, and derives a dispersion of the received plurality of output values. The number of pulses column 210 contains the number of pulses from the pulse detector 22. The validity column 212 contains a result of validity determination at the determining unit for the distance 30. The validity determination is determined as "valid" or "invalid". The validity determination is described in detail later.

First, the first process of the determining unit for the distance 30 is described. The determining unit for the distance 30 determines the validity of each measurement data on the basis of an HDOP, the number of satellites, a GPS velocity, and a dispersion of an angular velocity included in measurement data. The determining unit for the distance 30 reflects measurement data at a measurement timing that depends on a change in a period required for measuring an HDOP when determining the validity of measurement data at a predetermined measurement timing. Since the period required for measuring the HDOP changes depending on the arrangement of a GPS satellite, the determining unit for the distance 30 defines a maximum value of a change or a value close to the maximum value as a validity determination period. The validity determination period here is 3ΔT as illustrated in FIG. 2. That is, the determining unit for the distance 30 uses measurement data at three measurement timings when determining the validity of measurement data at one measurement timing. The determining of the validity is performed by comparing an HDOP, the number of satellites, a GPS velocity, a dispersion of angular velocities, and a threshold of each value (referred to as a "threshold for HDOP", a "threshold for the number of satellites", a "threshold for GPS velocity", a "threshold for dispersion of angular velocities" hereinafter). The determining unit for the distance 30 examines whether all of the HDOP, the number of satellites, the GPS velocity, and the angular velocity dispersion meet a condition.

For example, it is assumed that the threshold for HDOP is "6.0", the threshold for the number of satellites is "4", the threshold for GPS velocity is "8.0 m/s", and the threshold for dispersion of angular velocities is "4.0". Here, a process of determining, at the determining unit for the distance 30, the validity of measurement data for the element number "1" of FIG. 3 is described. Since HDOPs of the element number "1" to the element number "3" are equal to or less than the threshold for HDOP "6.0", the determining unit for the distance 30 determines that a condition for the HDOP is met. The number of satellites of the element number "1" to the element number "3" are equal to or more than the threshold for the number of satellites "4", the determining unit for the distance 30 determines that a condition for the number of satellites is met. Since GPS velocities of the element number "1" to the element number "3" is equal to or more than the threshold for GPS velocity "8.0 m/s", the determining unit for the distance 30 determines that a condition for the GPS velocity is met. As a result of the foregoing, since all the conditions are met, the determining unit for the distance 30 determines that measurement data of the element number "1" is "valid".

A process of determining, at the determining unit for the distance 30, the validity of measurement data for the element number "5" of FIG. 3 is described. Since of HDOPs of the element number "5" to the element number "7", a HDOP of the element number "7" is not equal to or less than the threshold for HDOP "6.0", the determining unit for the distance 30 determines that a condition for the HDOP is not met. As a result, the determining unit for the distance 30 determines that measurement data of the factor number "5" is "invalid." The determining unit for the distance 30 performs the same process on other elements and determines the validity of measurement data for each element. A determination result of validity is managed as in the validity column 212 of FIG. 3.

Next, the second process of the determining unit for the distance 30 is described. When of measurement data included in the integration period 4ΔT, valid measurement data and the number of pulses corresponding thereto meet a predetermined condition, the determining unit for the distance 30 determines to derive a distance conversion coefficient. Specifically, the determining unit for the distance 30 extracts a valid measurement data from four measurement data. The determining unit for the distance 30 specifies a maximum value and a minimum value of a GPS velocity from the extracted measurement data, and simultaneously, integrates the number of pulses corresponding to the extracted measurement data. When a difference between a maximum value and a minimum value is equal to or less than a first threshold, sum of the number of pulses is equal to or more than a second threshold, and the number of valid elements is equal to or more than a third threshold, the determining unit for the distance 30 determines a deriving operation.

The determination is based on, for example, the reason below. As a difference between a maximum value and a minimum value is small, it can be considered that a deviation in a GPS velocity is small, so that an accuracy of the GPS velocity improves. As sum of the number of pulses gets large, an influence of an error gets small, so that an accuracy in the sum of the number of pulses improves. As the number of valid elements increases, the number of measurement data and the number of pulses used for determination increases, so that an accuracy thereof improves. Since a distance conversion coefficient is derived on the basis of a GPS velocity and the number of pulses, when accuracy thereof improves, an accuracy of the distance conversion coefficient also improves.

For detailed description, it is assumed that the first threshold is "3.0", the second threshold is "5", and the third threshold is "2". The determining unit for the distance 30 confirms that data of the element number "1" of FIG. 3 is valid. Next, the determining unit for the distance 30 obtains a maximum value and a minimum value of a GPS velocity. For example, with initialization of MAX=0 and MIN=100, when MAX is smaller than a GPS velocity, replacement of MAX=GPS velocity is made. Likewise, when MIN is greater than a GPS velocity, replacement of MIN=GPS velocity is made. In case of the element number "1", replacements of both MAX and MIN are made to obtain MAX=16.7 and MIN=16.7. The determination unit for the distance 30 derives sum of the number of pulses. For example, initialization of SUM=0 is made, and the number of pulses is added. In case of the element number "1", it is a first element, so that SUM=45. The determining unit for the distance 30 performs the same process on the element numbers "2" to "4". As a result, MIN=16.5, MAX=16.5, and SUM=180 can be obtained.

The determining unit for the distance 30 confirms that a difference (MAX−MIN) "0.2" between a maximum value and a minimum value of a GPS velocity is equal to or less than the first threshold. The determining unit for the distance 30 also confirms that sum of the number of pulses "180" is equal to or more than the second threshold, and the number of valid elements "4" is equal to or more than the third threshold. As a result, the determining unit for the distance 30 determines to derive a distance conversion coefficient. When at least one of the three conditions is not met, the determining unit for the distance 30 suspends to derive a distance conversion coefficient.

When the determining unit for the distance 30 determines the deriving, the distance conversion coefficient calculator 34 derives a distance conversion coefficient on the basis of a GPS velocity and the number of pulses included in measurement data from the first delay unit 26. The distance conversion coefficient calculator 34 calculates a distance conversion coefficient Kv as follows on the basis of the sum ΣV of GPS velocities within an integration period and the sum ΣP of the number of pulses within the integration period.

$$Kv = \Sigma V / \Sigma P \quad (1)$$

The distance conversion coefficient calculator 34 may derive a distance conversion coefficient $Kv_n$ to be obtained this time by updating previously obtained distance conversion coefficient $Kv_{n-1}$ on the basis of the distance conversion coefficient Kv. A change by a noise is suppressed by this operation.

$$Kv_n = (1-h)Kv_{n-1} + hKv \quad (2)$$

where h is a constant value from 0 to 1.

The determining unit for the distance 30 may derive a distance conversion coefficient Kv' as follows by using the sum ΣV' of GPS velocities of an element determined valid within an integration period, and the sum ΣP' of the number of pulses of an element determined valid within the integration period instead of the operation of equation (1).

$$Kv' = \Sigma V' / \Sigma P' \quad (3)$$

The distance conversion executing unit 38 derives a movement distance d of a vehicle (not shown) as follows on the basis of the number of pulses P generated within a predetermined period ΔT and a distance conversion coefficient Kv from the number of pulses to a movement distance, accompanied with movement of a moving body. Here, the distance conversion coefficient Kv can be $Kv_n$ or Kv'.

$$d = KvP \quad (4)$$

The second delay unit 28 receives an output value from the angular velocity sensor 24, delays the received output value, and then outputs the same. That is, the second delay unit 28 controls an output timing of an output value, and outputs the controlled output value. Here, a delay period at the second delay unit 28 is determined by an error between a detection timing in an output value at the angular velocity sensor 24, and a measuring timing in measurement data at the position measuring unit 20. Generally, a period for deriving the latter is longer than a period for deriving the former. The second delay unit 28 delays an output value in order to reduce difference in a relative timing between them. A specific value of the delay period can be determined in advance by an experiment. A process of the second delay unit 28 is equivalent to controlling a detection timing of an output value at the angular velocity sensor 24.

The determining unit for the angular velocity 32 determines whether to derive an angular velocity conversion coefficient on the basis of measurement data from the position measuring unit 20 and an output value from the second delay unit 28. When determining the deriving, the determining unit for the angular velocity 32 orders the angular velocity conversion coefficient calculator 36 to update an angular velocity conversion coefficient. The determining unit for the angular velocity 32 performs this determination in two processes. In a first process, the determining unit for the angular velocity 32 determines an effective range of an integration value of output values over an integration period on the basis of a GPS velocity contained in measurement data. Here, the determining unit for the angular velocity 32 determines an effective range that seems narrow as a GPS velocity decreases. The determining unit for the angular velocity 32 integrates output values over an integration period (an integrated output value is hereinafter referred to as an "integrated value"). In a second process, the determining unit for the angular velocity 32 determines whether to derive an angular velocity conversion coefficient on the basis of the determined effective range and the integrated value. That is, when the integrated value is not included in the effective range, the determining unit for the angular velocity 32 determines suspense of deriving an angular velocity conversion coefficient. Before processes of these values are described in detail, a timing which is proposition of the processes is described herein.

Figure 4:
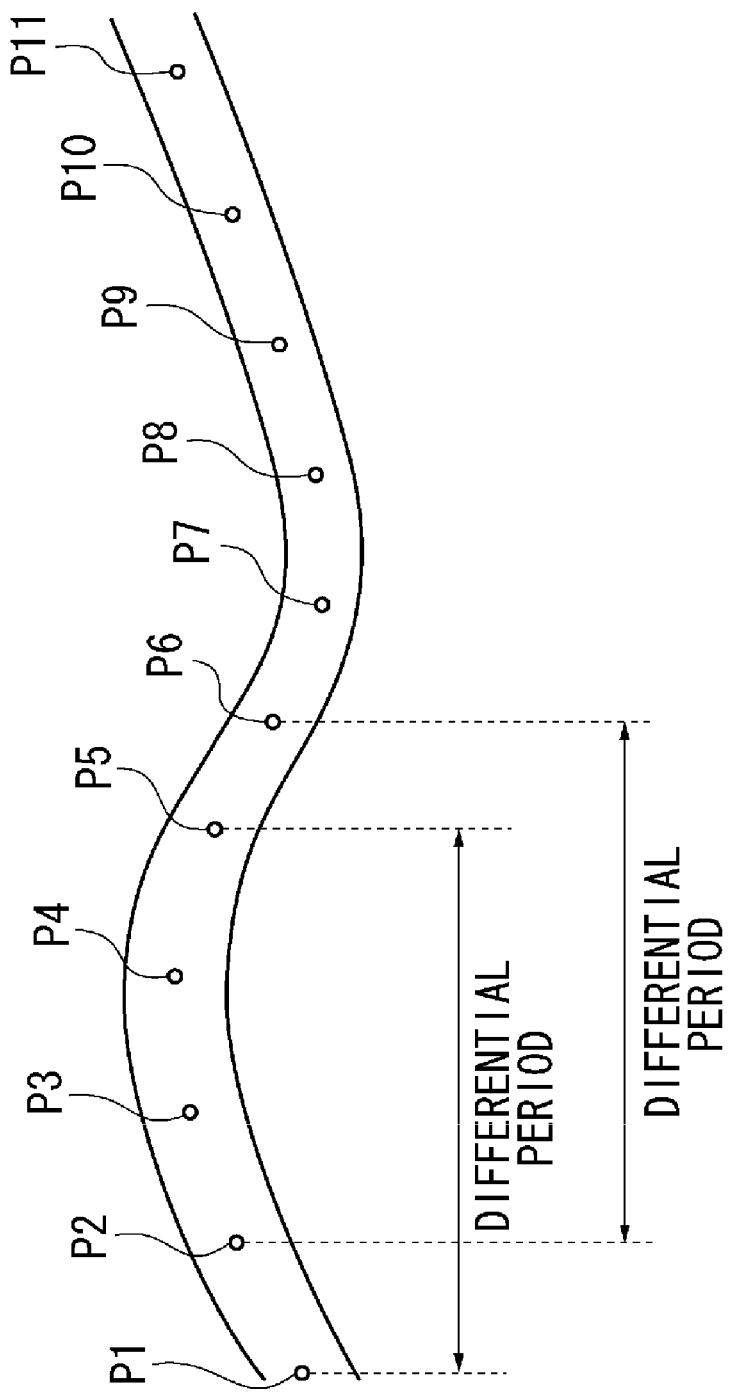
FIG. 4 is a view illustrating an outline of a process timing performed at the determining unit for the angular velocity in FIG. 1.

FIG. 4 illustrates an outline of a timing of a process performed at the determining unit for the angular velocity 32. FIG. 4 illustrates a plurality of GPS measurement points "P1" to "P11" on a road. A distance between adjacent measurement points corresponds to a distance by which a vehicle moves during the ΔT. A distance corresponding to 4ΔT is represented as a "differential period". Here, a length of a differential period is the same as that of an integration period.

First, the first process of the determining unit for the angular velocity 32 is described. The determining unit for the angular velocity 32 extracts a GPS velocity at a measurement point separated by a differential period, from measurement data. For example, a GPS velocity at a point P1 and a GPS velocity at a point P5 in FIG. 4 are extracted. Here, a GPS velocity at the measurement point P1, which is front in time, is represented by "V1", and a GPS velocity at the measurement point P5, which is rear in time, is represented by "V2". The determining unit for the angular velocity 32 compares V1 and V2 with a high speed threshold and a low speed threshold. Here, the high speed threshold has a larger value than that of the low speed threshold. In the case where V1 and V2 are equal to or more than the high speed threshold, the determining unit for the angular velocity 32 sets an effective range for high speed. In the case where V1 or V2 is less than the high speed threshold, and V1 and V2 is equal to or more than the low speed threshold, the determining unit for the angular velocity 32 sets an effective range for low speed. In the case where V1 or V2 is less than the low speed threshold, the determining unit for the angular velocity 32 determines suspense of deriving an angular velocity conversion coefficient. As described above, the effective range for high speed is defined such that it becomes wider than the effective range for low speed. Meanwhile, the determining unit for the angular velocity 32 derives an integration value by integrating each output value over an integration period corresponding to a differential period.

Here, it is assumed that an output value at a measurement timing n is $G_n$, an offset of an output value is Goffset, and an integration value is ΣG. The integration value ΣG is represented as follows.

$$\Sigma G = \Sigma (G_n - G\text{offset}) \Delta T \quad (5)$$

Here, Σ on the right term corresponds to integrating ($G_n$−Goffset)ΔT within an integration period. In the case where V1 and V2 are equal to or more than the high speed threshold, the determining unit for the angular velocity 32 inputs an upper limit for high speed into an upper limit threshold Gmax, and a lower limit for high speed into a lower limit threshold Gmin. A range between the upper limit threshold and an adjustable threshold corresponds to the effective range. A range between the upper limit for high speed and the lower limit for high speed corresponds to the effective range for high speed.

In the case where V1 or V2 is not equal to or more than the high speed threshold, and V1 and V2 are equal to or more than the low speed threshold, the determining unit for the angular velocity 32 inputs the upper limit for low speed into the upper limit threshold Gmax, and inputs the lower limit for low speed into the lower limit threshold Gmin. A range between the upper limit for low speed and the lower limit for low speed corresponds to the effective range for low speed. In the case where V1 or V2 is not equal to or more than the low speed threshold, the determining unit for the angular velocity 32 suspends deriving of an angular velocity conversion coefficient and ends the process. Generally, since a GPS has a tendency that an azimuth accuracy is high as a movement velocity is fast, and an azimuth accuracy is low as a movement velocity is slow, the determining unit for the angular velocity 32 changes an effective range depending on a GPS velocity. As a result, for a high speed, learning is made even in case of a small azimuth difference. For low speed, learning is made only in the case where an azimuth difference is large.

Next, the second process of the determining unit for the angular velocity 32 is described. The determining unit for the angular velocity 32 extracts "HDOP1" and the "number of satellites 1" at a front measurement point P1 in time, and extracts "HDOP2" and the "number of satellites 2" at a rear measurement point P5 in time. The determining unit for the angular velocity 32 defines in advance a fourth threshold for HDOP and a fifth threshold for the number of satellites. Here, the fourth threshold and the fifth threshold can be determined in advance by simulation and an experiment. Under this circumstance, in the case where an integration value is included in the effective range for high speed or the effective range for low speed, and HDOP1 and HDOP2 are equal to or less than the fourth threshold, and the number of satellites 1 and the number of satellites 2 are equal to or more than the fifth threshold, the determining unit for the angular velocity 32 determines to derive an angular velocity conversion coefficient. In the case where at least one of the conditions is not met, the determining unit for the angular velocity 32 suspends deriving of an angular velocity conversion coefficient.

In the case where (1) an integration value $\Sigma G$ is less than Gmax and greater than Gmin, (2) HDOP1 is equal to or less than the fourth threshold and HDOP2 is equal to or less than the fourth threshold, and (3) the number of satellites 1 is equal to or more than the fifth threshold and the number of satellites 2 is equal to or more than the fifth threshold, the determining unit for the angular velocity 32 determines to derive an angular velocity conversion coefficient. Meanwhile, in the case where one of (1) to (3) is not met, the determining unit for the angular velocity 32 suspends deriving of an angular velocity conversion coefficient. Afterward, the determining unit for the angular velocity 32 performs the processes on a combination of "P2" and "P6", and a combination of "P3" and "P7" in FIG. 4.

In the above processes, the upper limit threshold Gmax is set in order to avoid a situation where when a vehicle turns by 180° or more, the direction of an azimuth difference obtained from a GPS azimuth cannot be known. A case of turning around one time or more is removed by the upper limit threshold Gmax. Also, the lower limit threshold Gmin is set to reduce an influence which a minute change in $\Sigma G$ by a noise has on an angular velocity conversion coefficient $K\omega$. As described later, the angular velocity conversion coefficient $K\omega$ is represented by Equation (6). In the case where $\Sigma G$ of a denominator is small, even when $\Sigma G$ changes a little due to a noise, the angular velocity conversion coefficient $K\omega$ changes much. Meanwhile, in the case where a vehicle turns around in large scale, that is, when ($\theta2-\theta1$) and $\Sigma G$ are large, an accuracy of an angular velocity conversion coefficient can be improved. Here, $\theta1$ is an azimuth measured using a GPS at a predetermined measurement timing, and $\theta2$ is an azimuth measured using a GPS after a different period elapses from the measurement timing at which $\theta1$ is measured.

Specific values of the upper limit/lower limit for high speed, and the upper limit/lower limit for low speed are set as follows. The upper limit for high speed is set to the same value as the upper limit for low speed. For example, the upper limit for high speed is 120 degrees/12 seconds. Since the upper limit threshold is formed by the reason, the upper limit threshold does not need to be changed depending on a velocity. Meanwhile, the lower limit for high speed is set smaller than the lower limit for low speed. For example, the lower limit for high speed is 30 degrees/12 seconds, and the lower limit for low speed is 80 degrees/12 seconds. In case of high speed, since an accuracy of a GPS azimuth is high, an opportunity of learning increases by executing learning even when the lower limit for high speed is lowered and an angular velocity is small. In case of an express highway, since there are many gentle curves, it is preferable that the lower limit for high speed is low in order to increase a learning frequency. In case of low speed, there are many cases where a vehicle turns around with a lowered velocity such as an intersection. In this case, since an accuracy of a GPS azimuth is poor, deterioration in an accuracy of an angular velocity conversion coefficient is suppressed by making learning difficult. For example, learning is not performed for 20 Km/h or less, and a velocity is defined such that 20 km/h to 50 km/h correspond to a low speed and 50 km/h or more correspond to a high speed.

When deriving is determined at the determining unit for the angular velocity 32, the angular velocity conversion coefficient calculator 36 derives an angular velocity conversion coefficient on the basis of a difference in a differential period for an azimuth included in measured measurement data, and an integration value of an output value. The angular velocity conversion coefficient calculator 36 calculates an angular velocity conversion coefficient $K\omega$ as follows on the basis of an azimuth $\theta1$ measured using a GPS, an azimuth $\theta2$ measured using a GPS after a differential period elapses, an output value $G_n$, and an offset Goffset.

$$K\omega = (\theta2-\theta1)/\Sigma(G_n - G\text{offset})\Delta T \qquad (6)$$

The angular velocity conversion coefficient calculator 36 can derive an angular velocity conversion coefficient $K\omega_n$ to be obtained this time as follows by updating a previous obtained angular velocity conversion coefficient $K\omega_{n-1}$ on the basis of an angular velocity conversion coefficient $K\omega$. By this operation, a change by a noise is suppressed.

$$K\omega_n = (1-h)K\omega_{n-1} + hK\omega \qquad (7)$$

where h is a constant value from 0 to 1.

The angular velocity conversion executing unit 40 derives an angular velocity $\omega$ of a vehicle (not shown) as follows on the basis of an output value $G_n$ and an angular velocity conversion coefficient $K\omega$ from the output value and an angular velocity. Here, the angular velocity conversion coefficient can be $K\omega_n$.

$$\omega = K\omega G_n \qquad (8)$$

The self-contained navigation calculator 42 receives a movement distance d of a vehicle from the distance conversion executing unit 38, and also receives an angular velocity $\omega$ of the vehicle from the angular velocity conversion executing unit 40. The self-contained navigation calculator 42 also derives a current position on the basis of the movement distance d and the angular velocity $\omega$. Here, it is assumed that an arbitrary position on an earth surface is an origin, an east-west direction component of a position using an east direction as a positive direction is x, a north-south direction component of a position using a north direction as a positive direction is y, an azimuth using a direction directing an east direction to a north direction as a positive direction is 0, a subscript n is a current time, and a subscript n-1 is a previous time. The self-contained navigation calculator 42 derives a current position $x_n$ and $y_n$, and a current azimuth $\theta_n$ as follows using a previous position $x_{n-1}$ and $y_{n-1}$, a previous azimuth $\theta_{n-1}$, a movement distance $d_{n-1}$ from a previous position to a current position, and a previous angular velocity $\omega_{n-1}$. Here, it is assumed that the current position and the previous position are in the neighborhood of the origin.

$$\begin{pmatrix} x_n \\ y_n \\ \theta_n \end{pmatrix} = \begin{pmatrix} x_{n-1} \\ y_{n-1} \\ \theta_{n-1} \end{pmatrix} + \begin{pmatrix} \cos\theta_{n-1} & 0 \\ \sin\theta_{n-1} & 0 \\ 0 & \Delta T \end{pmatrix} \begin{pmatrix} d_{n-1} \\ \omega_{n-1} \end{pmatrix}$$ [Equation 1]

The memory unit 14 stores map data, etc. as digital data. The memory unit 14 is formed using a memory medium such as a hard disk drive. The IF unit 16 includes an operation unit (not shown) and a display unit (not shown). The operation unit includes buttons and receives an instruction from a user. The operation unit receives destination information as an instruction related to a navigation function. The display unit includes a display, and displays a map stored in the memory unit 14 or a path up to a destination received by the operation unit. The data processor 12 receives a current position from the self-contained navigation calculator 42, and also performs a navigation function with reference to map data stored in the memory unit 14. The data processor 12 receives an instruction regarding a destination from the operation unit, and derives a path from the current position to the destination on the map data. The data processor 12 also decodes map data and displays the decoded map data on the display unit as a map.

This construction can be realized, in a hardware manner, using a central processing unit (CPU), memory of an arbitrary computer, and large-scale integration (LSI). This construction can be realized, in a software manner, using a program loaded on memory, but here, functional blocks realized by cooperation of hardware and software are illustrated. Therefore, it would be understood to those skilled in the art that the functional blocks can be realized in various forms using hardware only, software only, or a combination thereof.

Figure 5:
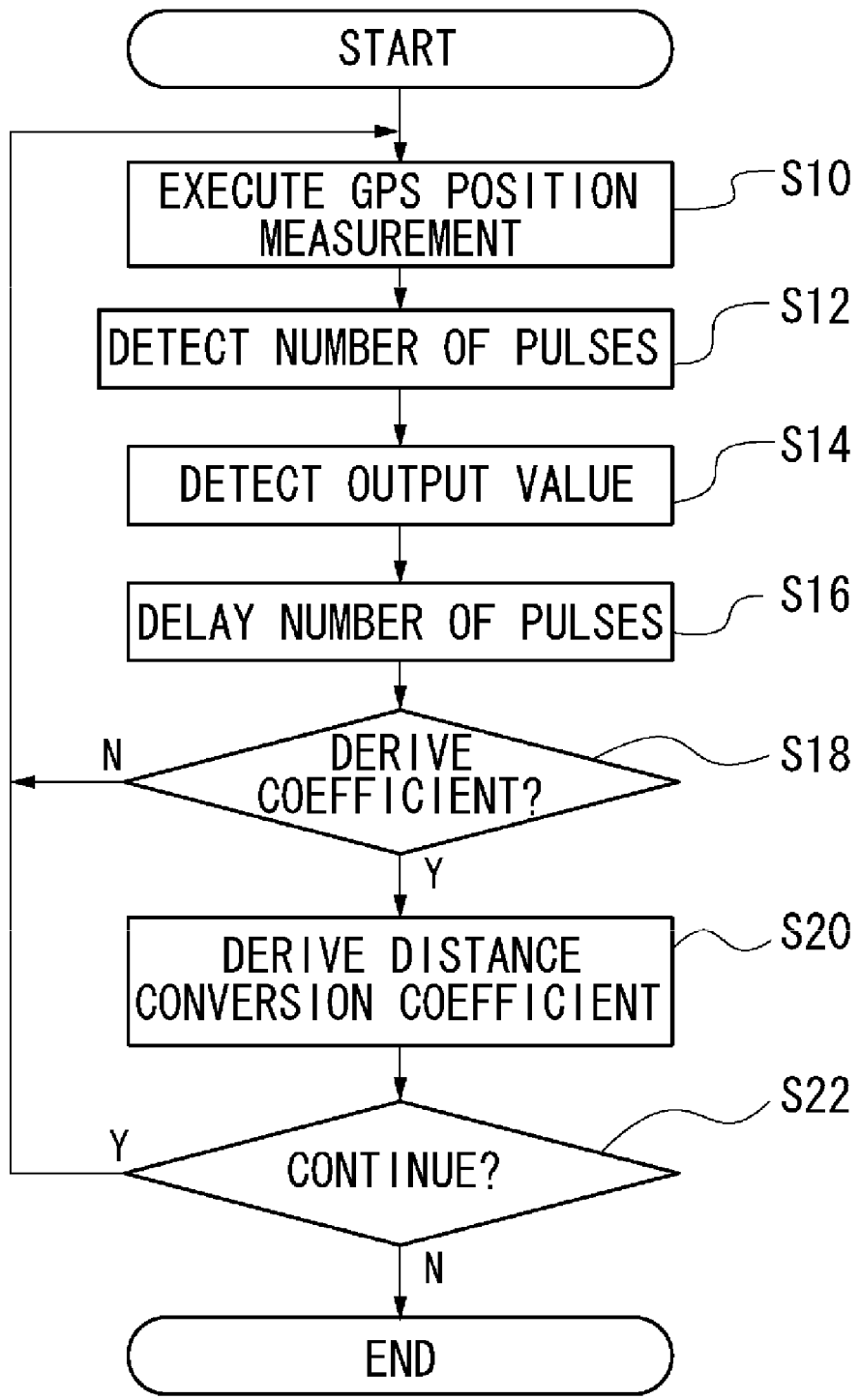
FIG. 5 is a flowchart illustrating a deriving sequence at the determining unit for the distance in FIG. 1.

The operation of the navigation apparatus 100 having the above construction is described below. FIG. 5 is a flowchart illustrating a deriving sequence at the determining unit for the distance 30. In step S10, the position measuring unit 20 performs a GPS position measurement. In step S12, the pulse detector 22 detects the number of pulses. In step S14, the angular velocity sensor 24 detects an output value. In step S16, the first delay unit 26 delays the number of pulses. When the determining unit for the distance 30 determines to derive a distance conversion coefficient (Y in step S18), the distance conversion coefficient calculator 34 derives a distance conversion coefficient in step S20. Meanwhile, when the determining unit for the distance 30 determines not to derive a distance conversion coefficient (N in step S18), step S10 is performed. A process is continued (Y in step S22), step S10 is performed. When the process is not continued (N in step S22), the process is ended.

Figure 6:
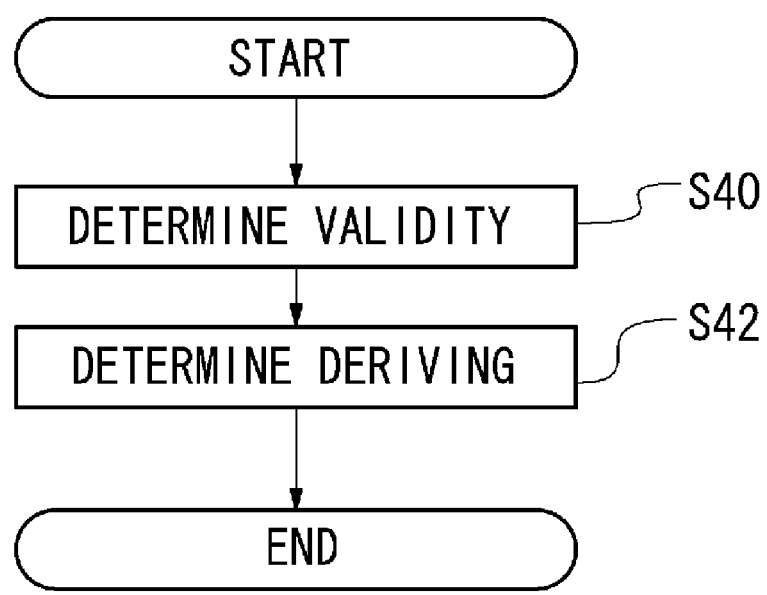
FIG. 6 is a flowchart illustrating a determining sequence at the determining unit for the distance in FIG. 1.

FIG. 6 is a flowchart illustrating a determining sequence at the determining unit for the distance 30. FIG. 6 corresponds to the process of step S18 in FIG. 5. The determining unit for the distance 30 determines validity in step S40, and subsequently, determines to derive a distance conversion coefficient in step S42.

Figure 7:
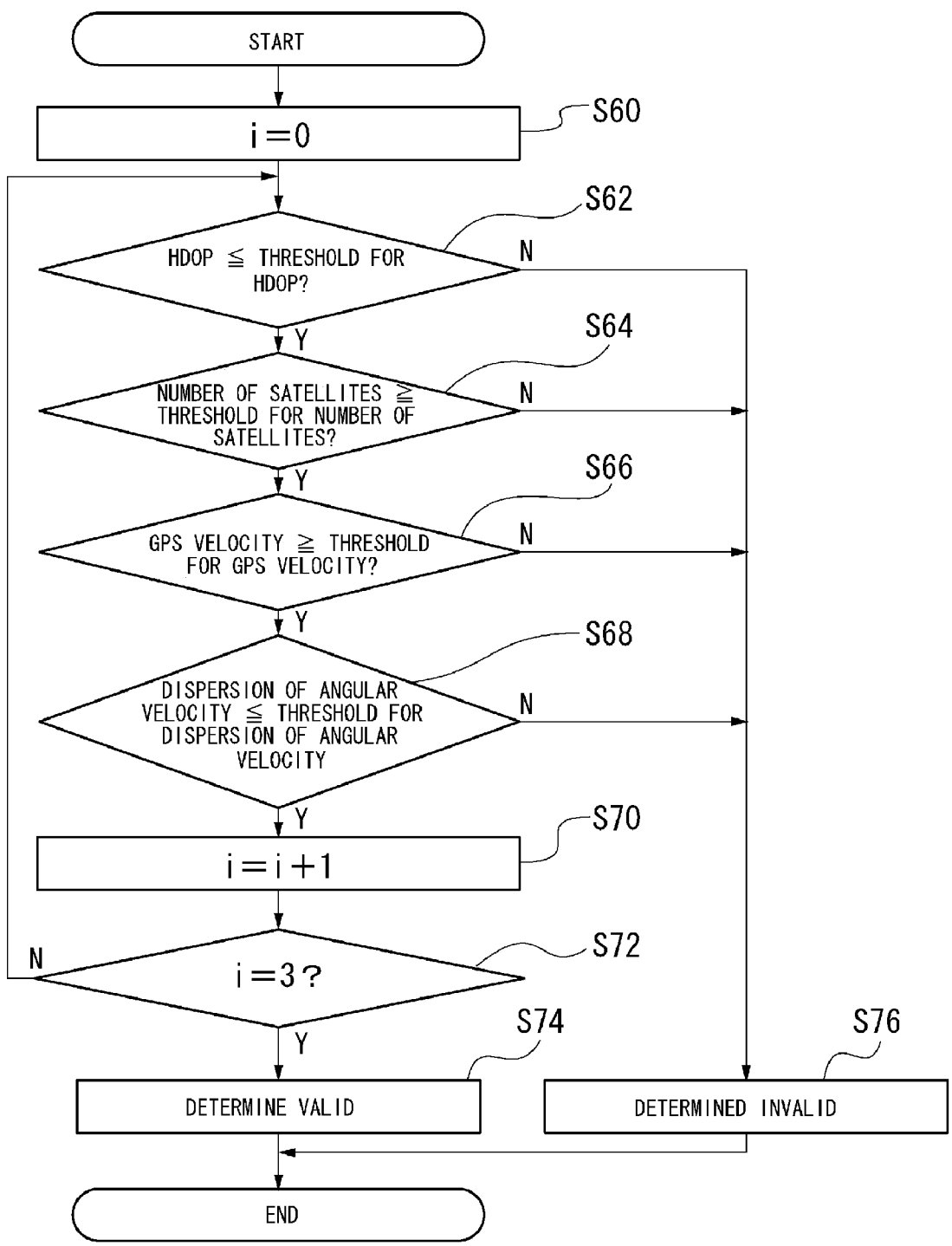
FIG. 7 is a flowchart illustrating a determining sequence of validity at the determining unit for the distance in FIG. 1.

FIG. 7 is a flowchart illustrating a determining sequence of validity at the determining unit for the distance 30. FIG. 7 corresponds to step S40 in FIG. 6. Here, a case of determining the validity of measurement data at a predetermined measurement timing is described. In step S60, the determining unit for the distance 30 sets a variable i to 0. When HDOP is equal to or less than a threshold for HDOP (Y in step S62), the number of satellites is equal to or more than a threshold for the number of satellites (Y in step S64), a GPS velocity is equal to or more than a threshold for GPS velocity (Y in step S66), and a dispersion of an angular velocity is equal to or less than a threshold for angular velocity dispersion (Y in step S68), the determining unit for the distance 30 adds 1 to i in step S70. When i is not 3 (N in step S72), step S62 is performed. When i is 3 (Y in step S72), the determining unit for the distance 30 determines relevant measurement data is valid in step S74. When HDOP is not the threshold for HDOP or less (N in step S62), the number of satellites is not equal to or more than the threshold for the number of satellites (N in step S64), a GPS velocity is not equal to or more than the threshold for GPS velocity (N in step S66), or a dispersion of angular velocities is not equal to or less than the threshold for angular velocity dispersion (N in step S68), the determining unit for the distance 30 determines relevant measurement data is invalid in step S76.

Figure 8:
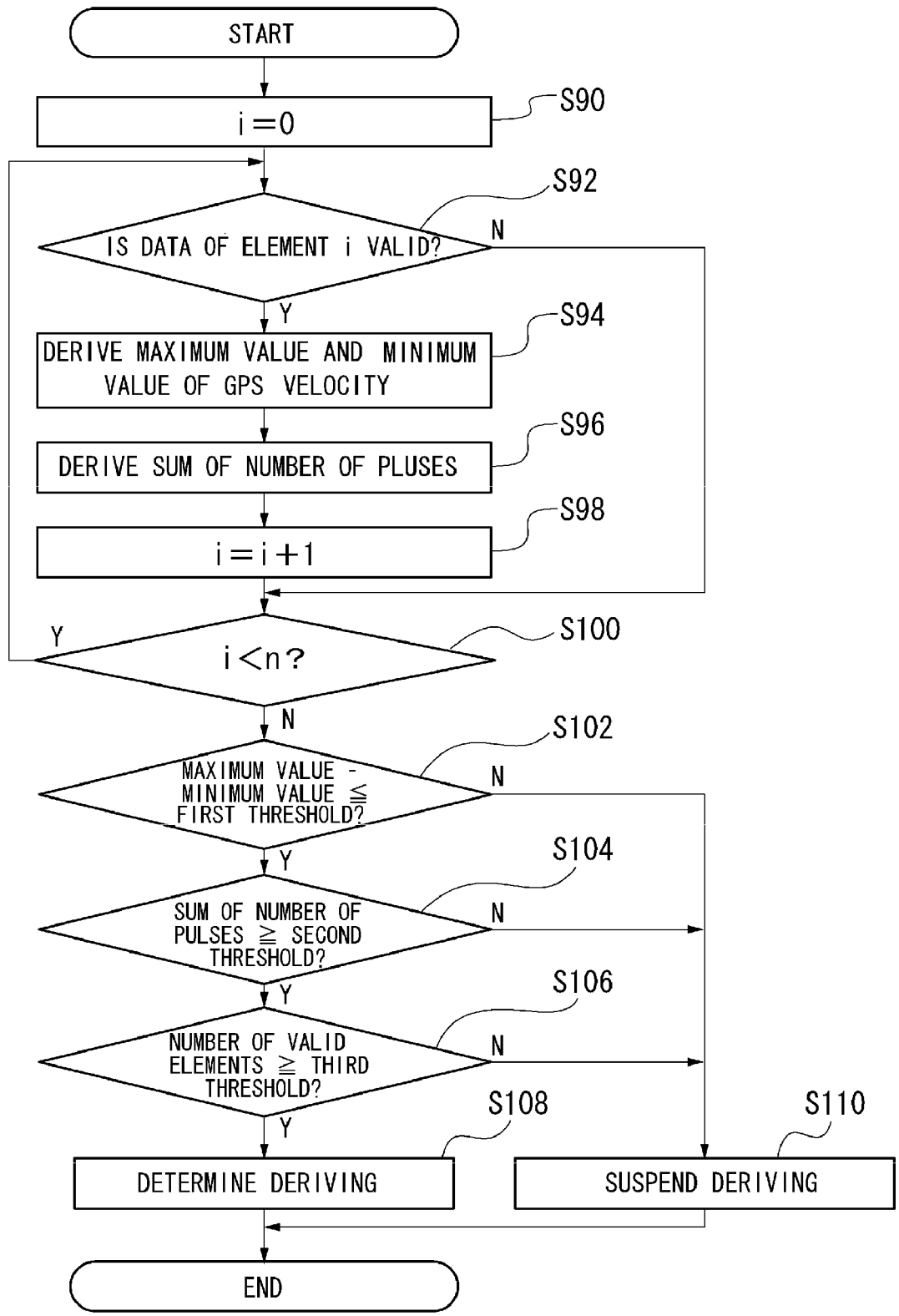
FIG. 8 is a flowchart illustrating a sequence of determining a deriving at the determining unit for the distance in FIG. 1.

FIG. 8 is a flowchart illustrating a sequence of determining a deriving at the determining unit for the distance 30. FIG. 8 corresponds to step S42 in FIG. 6. Here, an integration period n becomes 4. In step S90, the determining unit for the distance 30 sets a variable i to 0. When data of an element i is valid (Y in step S92), the determining unit for the distance 30 derives a maximum value and a minimum value of a GPS velocity in step S94, and derives the sum of the number of pulses in step S96. After that, in step S98, the determining unit for the distance 30 adds 1 to i. Meanwhile, when data of an element i is invalid (N in step S92), step S94 to step S98 are skipped. When i is smaller than n (Y in step S100), step S92 is performed.

When i is not smaller than n (N in step S100), a difference between a maximum value and a minimum value is equal to or less than a first threshold (Y in step S102), the sum of the number of pulses is equal to or more than a second threshold (Y in step S104), and the number of valid elements is equal to or more than a third threshold (Y in step S106), the determining unit for the distance 30 determines to derive a distance conversion coefficient in step S108. When a difference between a maximum value and a minimum value is not equal to or less than the first threshold (N in step S102), the sum of the number of pulses is not equal to or more than the second threshold (N in step S104), or the number of valid elements is not equal to or more than the third threshold (N in step S106), the determining unit for the distance 30 suspends deriving of a distance conversion coefficient in step S110.

Figure 9:
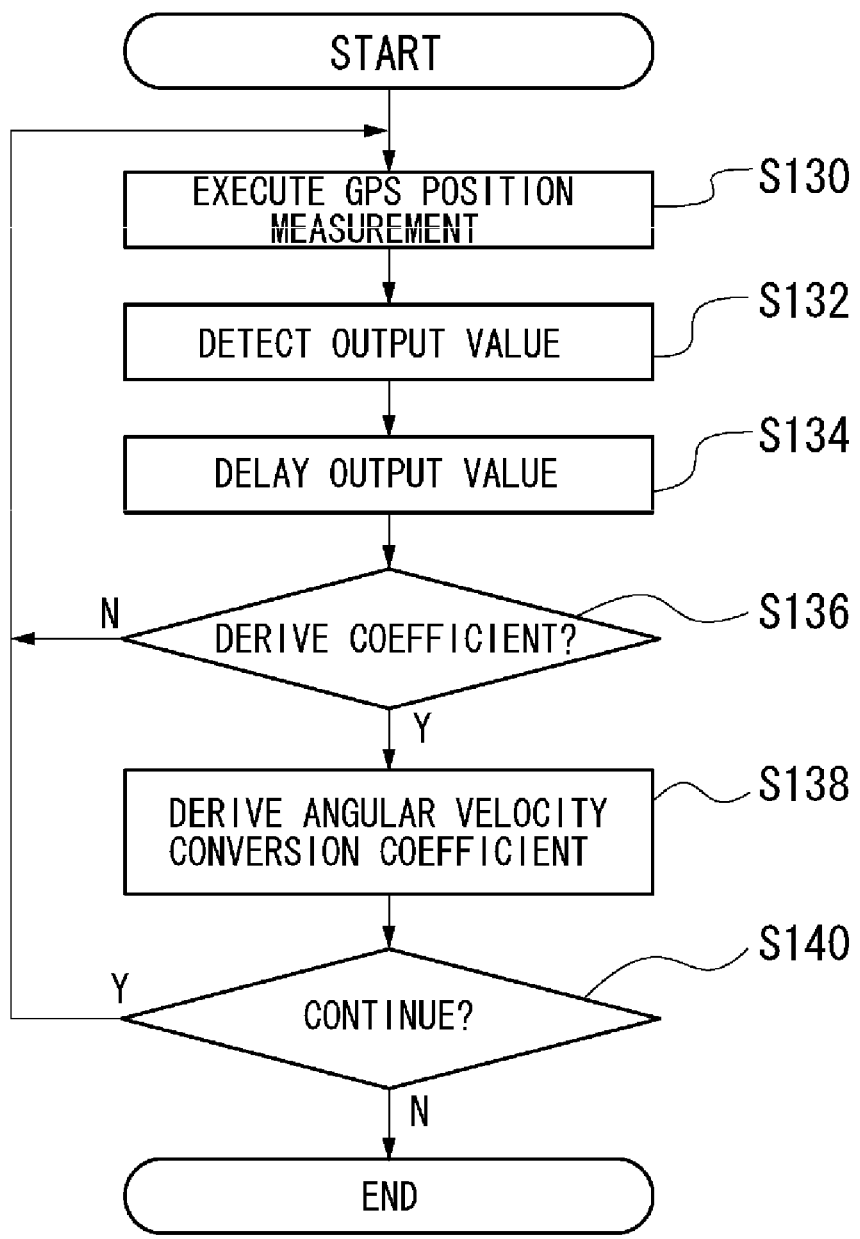
FIG. 9 is a flowchart illustrating a deriving sequence at the determining unit for the angular velocity in FIG. 1.

FIG. 9 is a flowchart illustrating a deriving sequence at the determining unit for the angular velocity 32. In step S130, the position measuring unit 20 performs a GPS position measurement. In step S132, the angular velocity sensor 24 detects an output value. In step S134, the second delay unit 28 delays an output value. When the determining unit for the angular velocity 32 determines to derive an angular velocity conversion coefficient (Y in step S136), the angular velocity conversion coefficient calculator 36 derives an angular velocity conversion coefficient in step S138. Meanwhile, when the determining unit for the angular velocity 32 does not determine to derive an angular velocity conversion coefficient (N in step S136), step S130 is performed. When a process is continued (Y in step S140), step S130 is performed. When the process is not continued (N in step S140), the process is ended.

Figure 10:
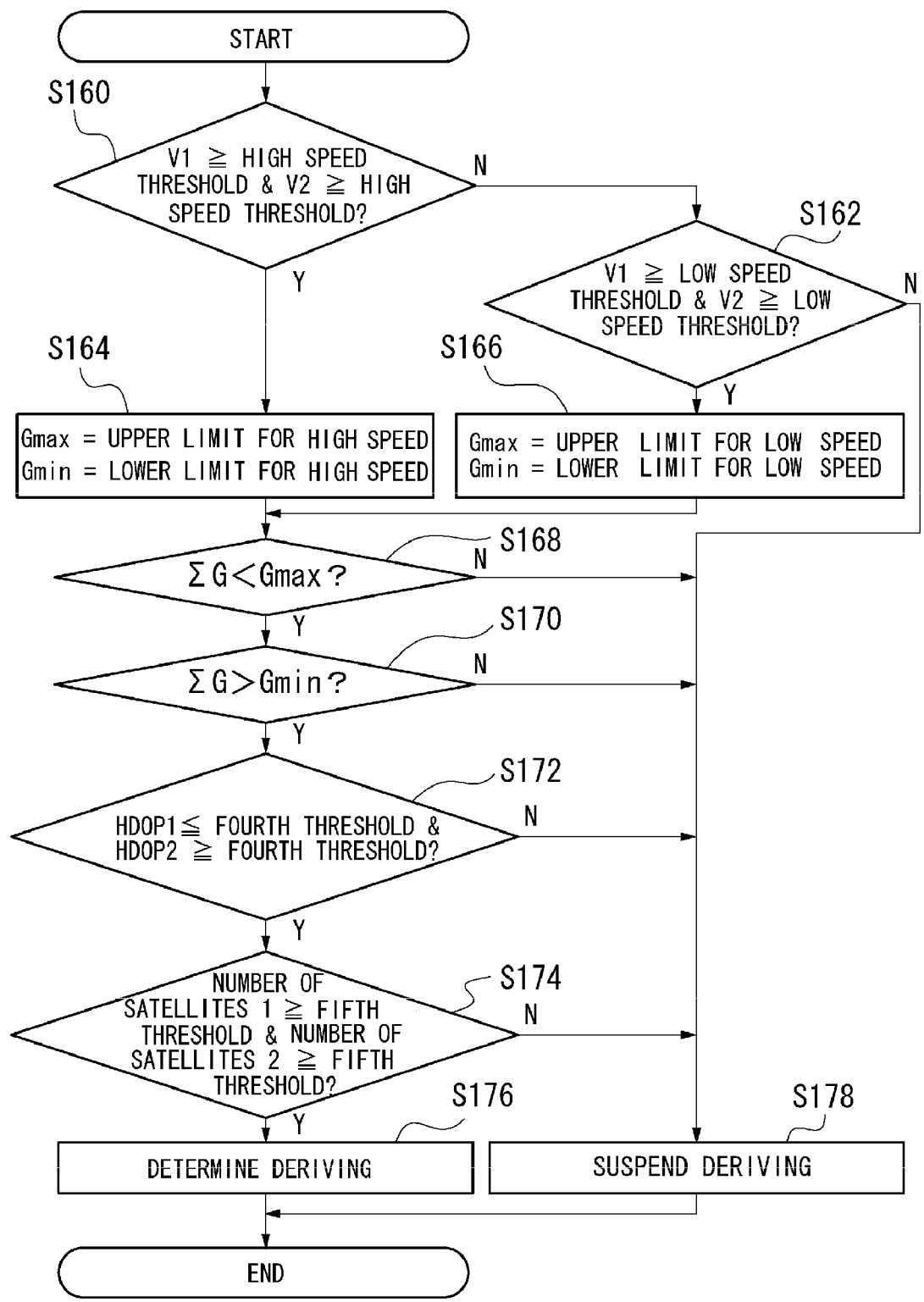
FIG. 10 is a flowchart illustrating a determining sequence at the determining unit for the angular velocity in FIG. 1.

FIG. 10 is a flowchart illustrating a determining sequence at the determining unit for the angular velocity 32. FIG. 10 corresponds to step S136 in FIG. 9. When V1 is equal to or more than the high speed threshold and V2 is equal to or more than the high speed threshold (Y in step S160), the determining unit for the angular velocity 32 inputs the upper limit for high speed into Gmax, and inputs the lower limit for high speed into Gmin in step S164. Meanwhile, when V1 is not equal to or more than the high speed threshold, or V2 is not equal to or more than the high speed threshold (N in step S160), and V1 is equal to or more than the low speed threshold and V2 is equal to or more than the low speed threshold (Y in step S162), the determining unit for the angular velocity 32 inputs the upper limit for low speed into Gmax and inputs the lower limit for low speed into Gmin in step S166.

When $\Sigma G$ is smaller than Gmax (Y in step S168), $\Sigma G$ is greater than Gmin (Y in step S170), HDOP1 and HDOP2 are equal to or less than the fourth threshold (Y in step S172), and the number of satellites 1 and the number of satellites 2 are equal to or more than the fifth threshold (Y in step S174), the determining unit for the angular velocity 32 determines to derive an angular velocity conversion coefficient in step S176. Meanwhile, when V1 is not equal to or more than the low speed threshold, or V2 is not equal to or more than the low speed threshold (N in step S162), or $\Sigma G$ is not smaller than Gmax (N in step S168), or $\Sigma G$ is not greater than Gmin (N in step S170), HDOP1 and HDOP2 are not equal to or less than the fourth threshold (N in step S172), and the number of satellites 1 and the number of satellites 2 are not equal to or more than the fifth threshold (N in step S174), the determining unit for the angular velocity 32 suspends deriving of an angular velocity conversion coefficient in step S178.

According to an embodiment of the present invention, when determining the validity of measurement data at a predetermined measurement timing, measurement data at a measurement timing that depends on a change in a period required for measuring HDOP is reflected, so that a timing error between measurement data and the number of pulses can be reduced by a change. Since a maximum value of a change in the period required for measuring HDOP is defined and all measurement data included therein are considered, an influence of a change in the period required for measuring HDOP can be reduced even when an accurate value of the change in the period required for measuring HDOP is not recognized. Since an accurate value of a change in the period required for measuring HDOP is not recognized, a process can be simply performed.

Since validity is determined with reflection of measurement data at a measurement timing that depends on a change in the period required for measuring HDOP, an accuracy of determination can be improved. Since an output timing of the number of pulses is controlled depending on an error between a detection timing of the number of pulses and a measurement timing of a GPS velocity, an error between the detection timing and the measurement timing can be reduced. Since a determination accuracy of validity improves, an accuracy of determining whether to derive a distance conversion coefficient can be improved. Since the accuracy of determining whether to derive a distance conversion coefficient improves, an accuracy of a distance conversion coefficient can be improved. Since the accuracy of a distance conversion coefficient improves, a specific accuracy of a position can be improved.

Since whether to derive an angular velocity conversion coefficient is determined using an effective range determined depending on a GPS velocity as a reference, a reduction in an opportunity of deriving an angular velocity conversion coefficient can be suppressed, and also, an accuracy of determining whether to derive an angular velocity conversion coefficient can be improved. Since an effective range that seems narrow as a GPS velocity decreases is determined, deterioration in an accuracy of determination by the decrease of a GPS velocity can be suppressed. Since an output timing of an output value of the angular velocity sensor is controlled depending on an error between a detection timing of an output value of the angular velocity sensor and a measurement timing of measurement data, the error between the detection timing and the measurement timing can be reduced. Since an accuracy of determining validity improves, an accuracy of determining whether to derive an angular velocity conversion coefficient can be improved. Since the accuracy of determining whether to derive an angular velocity conversion coefficient improves, an accuracy of an angular velocity conversion coefficient can be improved. Since the accuracy of an angular velocity conversion coefficient improves, a specific accuracy of a position can be improved. Since reduction in an opportunity of deriving an angular velocity conversion coefficient is suppressed, reduction in a learning velocity can be suppressed.

Since a data delay such as HDOP from a GPS and the number of satellites is considered and a distance conversion coefficient is calculated when a predetermined condition is met, an accuracy of a distance conversion coefficient can be improved. Since a condition of learning is relieved so that a frequency of learning is increased, and also, a delay in calculation of an absolute azimuth inside a GPS is considered, an angular velocity conversion coefficient can be derived at high accuracy within a short time. Also, since a time interval between GPS azimuth measurement positions of two points for obtaining an azimuth difference is fixed, and in the case where GPS data and gyro data meet a predetermined condition regardless of the shape of a road, learning is always performed to increase a learning opportunity, and also a delay in calculation of an absolute azimuth inside a GPS is considered and an angular velocity conversion coefficient is calculated when a predetermined condition is met, an angular velocity conversion coefficient can be derived at high accuracy within a short time.

Like the first embodiment, a second embodiment of the present invention relates to a navigation apparatus. In the first embodiment, the distance conversion coefficient calculator 34 derives a distance conversion coefficient on the basis of the number of pulses whose output timing has been controlled at a first delay unit 26, and measurement data from the position measuring unit 20. Meanwhile, the determining unit for the distance 30 receives measurement data from the position measuring unit 20, the number of pulses from the pulse detector 22, and an output value from the angular velocity sensor 24. That is, timing control for the number of pulses is not performed. The determining unit for the distance 30 absorbs an error of a timing in a validity determination period or an integration period. Alternatively, the determining unit for the distance 30 controls a timing error when generating data shown in FIG. 3. That is, the determining unit for the distance 30 controls a timing. The determining unit for the distance 30 also controls a timing event for an output value. An output value whose output timing has been controlled at the second delay unit 28 is input to the determining unit for the angular velocity 32 and the angular velocity conversion coefficient calculator 36.

Meanwhile, in a navigation apparatus 100 according to the second embodiment, a determining unit for a distance 30 receives the number of pulses whose output timing has been controlled at the first delay unit 26 instead of the number of pulses from a pulse detector 22. That is, the determining unit for the distance 30 uses the number of pulses whose output timing has been controlled. As a result, in the determining unit for a distance 30, a validity determination period or an integration period is shortened, or a timing control process is reduced. Meanwhile, also the output timing of an output value is controlled at the second delay unit 28 likewise, and is then input the determining unit for a distance 30.

Figure 11:
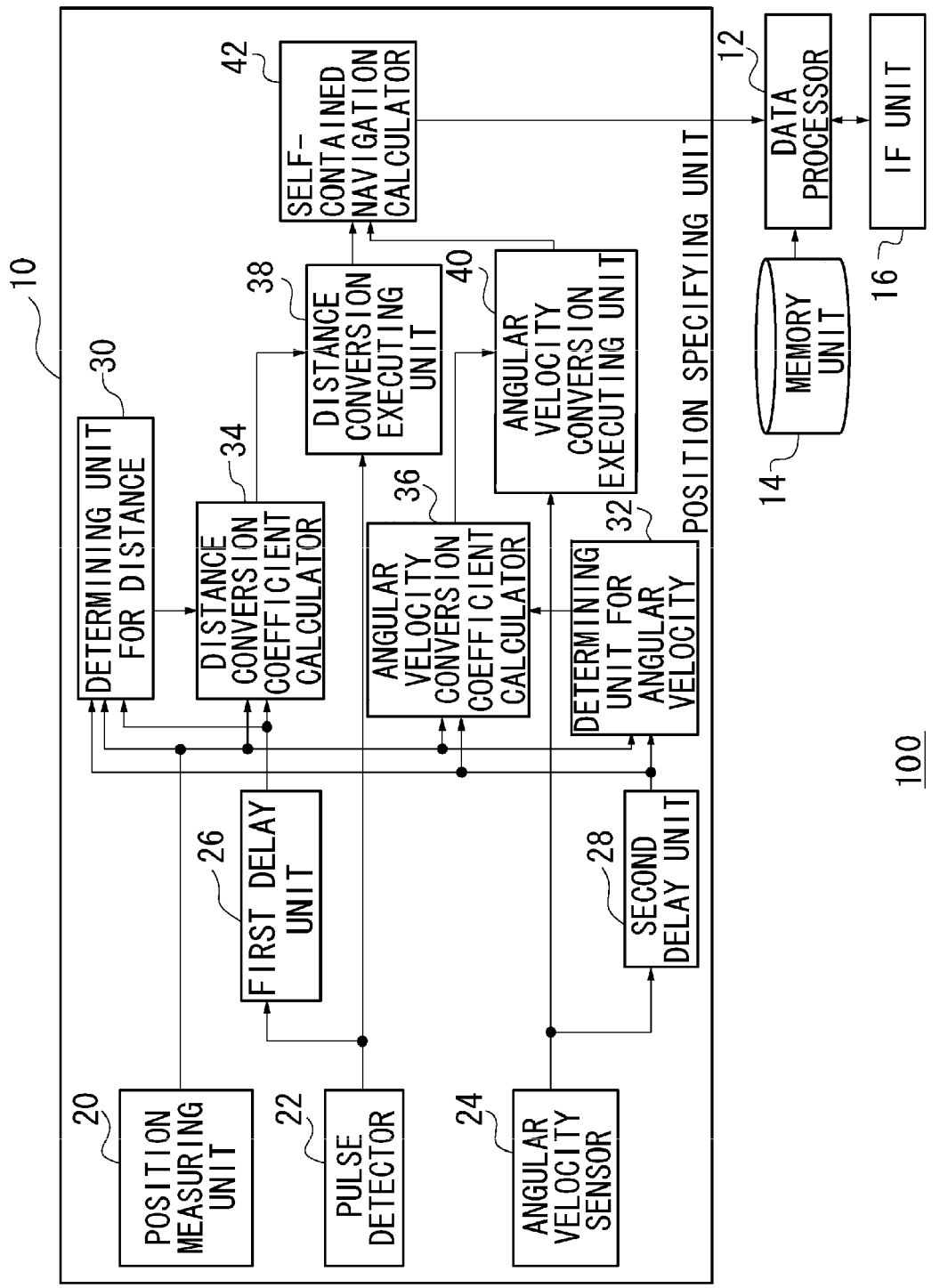
FIG. 11 is a view illustrating a construction of a navigation apparatus according to a second embodiment of the present invention.

FIG. 11 illustrates a construction of a navigation apparatus 100 according to the second embodiment of the present invention. The navigation apparatus 100 includes the same elements as those of FIG. 1. However, in the navigation apparatus 100 of FIG. 11, an output from the first delay unit 26 is also connected to the determining unit for the distance 30 in addition to a distance conversion coefficient calculator 34. An output from the second delay unit 28 is also input to the determining unit for the distance 30 in addition to a determining unit for an angular velocity 32 and an angular velocity conversion coefficient calculator 36.

The first delay unit 26 outputs the number of delayed pulses to the determining unit for the distance 30 and the distance conversion coefficient calculator 34. The second delay unit 28 also outputs the number of delayed output values to the determining unit for the distance 30, the angular velocity conversion coefficient calculator 36, and the determining unit for an angular velocity 32. The determining unit for the distance 30 receives the number of pulses from the first delay unit 26, measurement data from the position measuring unit 20, and an output value from the second delay unit 28. That is, the determining unit for the distance 30 receives the number of pulses whose output timing has been controlled at the first delay unit 26, and the output value whose output timing has been controlled at the second delay unit 28 in addition to the measurement data. The determining unit for the distance 30 uses the number of pulses, velocity data, and an output value in order to execute the above-described process.

According to the embodiments of the present invention, since the number of pulses and an output value whose output timing has been controlled are used at the determining unit for the distance 30, an amount of processes at the determining unit for the distance 30 can be reduced. Since a validity determination period or an integration period is shortened, an amount of processes can also be reduced. The validity determination period or the integration period is also shortened, a process delay can therefore be reduced.

In the above, the present invention has been described with reference to the embodiments thereof. These embodiments are exemplary, and it would be understood to those skilled in art that various modifications can be made by combinations of respective elements or processes of the embodiments, and those modifications also fall within the sprit and scope of the present invention.

In the embodiments of the present invention, HDOP is used as an accuracy reduction index. However, the accuracy reduction index is not limited thereto, but Geometric Dilution of Precision (GDOP), Position Dilution of Precision (PDOP), or a combination thereof can be used as an accuracy reduction index. According to a modification, various parameters can be used for determination.

While the exemplary embodiments of the present invention and their modifications have been described using specific terms, such description is for illustrative purposes only, and it is to be understood that changes and variations may still be further made without departing from the spirit or scope of the appended claims.

What is claimed is:

1. A navigation apparatus for deriving a movement distance of a moving body on the basis of the number of pulses generated within a predetermined period accompanied with movement of the moving body and a conversion coefficient from the number of pulses to a movement distance, the navigation apparatus comprising:
    a detector configured to detect the number of pulses;
    a measuring unit configured to measure measurement data comprising at least a movement velocity and an accuracy reduction index on the basis of a signal received from a satellite, the measurement data measured every measurement timing;
    a first determining unit configured to determine validity of measurement data at each measurement timing on the basis of measurement data measured at the measuring unit;
    a second determining unit configured to determine whether to derive the conversion coefficient using the measurement data determined valid at the first determining unit;
    a deriving unit configured to derive the conversion coefficient on the basis of a movement velocity of the measurement data measured at the measuring unit and the number of pulses detected at the detector when the derivation is determined at the second determining unit, wherein the first determining unit reflects measurement data at a measurement timing that depends on a change of a period required for measuring the accuracy reduction index when determining validity of measurement data at a predetermined measurement timing; and
    a delay unit configured to control an output timing of the number of pulses from the detector to match with a measurement timing of measurement data at the measuring unit, the delay unit configured to output the number of controlled pulses to the deriving unit.

2. A navigation apparatus for deriving a movement distance of a moving body on the basis of the number of pulses generated within a predetermined period accompanied with movement of the moving body and a conversion coefficient from the number of pulses to a movement distance, the navigation apparatus comprising:
    a detector configured to detect the number of pulses;
    a measuring unit configured to measure measurement data comprising at least a movement velocity and an accuracy reduction index on the basis of a signal received from a satellite, the measurement data measured every measurement timing;
    a first determining unit configured to determine validity of measurement data at each measurement timing on the basis of measurement data measured at the measuring unit;
    a second determining unit configured to determine whether to derive the conversion coefficient using the measurement data determined valid at the first determining unit; and
    a deriving unit configured to derive the conversion coefficient on the basis of the movement velocity contained in the measurement data measured at the measuring unit, and the number of pulses detected at the detector when the derivation is determined at the second determining unit, wherein a delay unit controls a detection timing of the number of pulses at the detector in order to match with a measurement timing of measurement data at the measuring unit, and then derives the conversion coefficient.

3. A navigation apparatus comprising:
a detector configured to detect the number of pulses generated within a predetermined period accompanied with movement of a moving body;
a measuring unit configured to measure measurement data comprising at least a movement velocity and an accuracy reduction index on the basis of a signal received from a satellite, the measurement data measured every measurement timing;
a delay unit configured to control a detection timing of the number of pulses at the detector to match with a measurement timing of measurement data at the measuring unit;
a first determining unit configured to determine validity of measurement data at each measurement timing on the basis of measurement data measured at the measuring unit;
a second determining unit configured to determine whether to derive the conversion coefficient from the number of pulses to a movement distance of the moving body using the measurement data determined valid at the first determining unit and the number of pulses whose detection timing has been controlled at the delay unit; and
a deriving unit configured to derive the conversion coefficient on the basis of the movement velocity contained in the measurement data measured at the measuring unit, and the number of pulses whose detection timing has been controlled at the delay unit when the derivation is determined at the second determining unit.

4. A method for deriving a conversion coefficient, the method comprising:
detecting, using a detector, the number of pulses generated within a predetermined period accompanied with movement of a moving body;
measuring, using a measuring unit, measurement data comprising at least a movement velocity and an accuracy reduction index of the moving body on the basis of a signal received from a satellite, wherein the measurement data is measured every measurement timing;
controlling a detection timing of the number of pulses in order to match with a measurement timing of measurement data;
determining, using hardware or using hardware and software, validity of measurement data at each measurement timing on the basis of measured measurement data;
determining whether to derive the conversion coefficient using the measurement data determined valid; and
deriving the conversion coefficient on the basis of the movement velocity contained in the measured measurement data and the number of pulses whose detection timing has been controlled when the derivation is determined, wherein the determining validity comprises reflecting measurement data at a measurement timing that depends on a change in a period required for measuring the accuracy reduction index when determining the validity of measurement data at a predetermined measurement timing.

5. A method for deriving a conversion coefficient, the method comprising:
detecting, using a detector, the number of pulses generated within a predetermined period accompanied with movement of a moving body;
measuring, using a measuring unit, measurement data comprising at least a movement velocity and an accuracy reduction index on the basis of a signal received from a satellite, the measurement data measured every measurement timing;
controlling a detection timing of the number of pulses in order to match with a measurement timing of measurement data;
determining, using hardware or using hardware and software, validity of measurement data at each measurement timing on the basis of measured measurement data;
determining whether to derive the conversion coefficient from the number of pulses to a movement distance of the moving body using the measurement data determined valid, and the number of pulses whose detection timing has been controlled; and
deriving the conversion coefficient on the basis of the movement velocity contained in the measured measurement data and the number of pulses whose detection timing has been controlled when the derivation is determined.

6. A navigation apparatus for deriving an angular velocity of a moving body on the basis of an output value of an angular velocity sensor provided to the moving body and a conversion coefficient from the output value of the angular velocity sensor to an angular velocity, the navigation apparatus comprising:
a measuring unit configured to measure measurement data, the measurement data including at least an azimuth of a movement direction and a movement velocity on the basis of a signal periodically received from a satellite;
a decision unit configured to determine an effective range for an integration value of output values from the angular velocity sensor over a predetermined period on the basis of the movement velocity contained in the measurement data as measured at the measuring unit;
a determining unit configured to determine suspense of deriving of the conversion coefficient to determine whether to derive the conversion coefficient when the integration value of the output values from the angular velocity sensor over the predetermined period is not included in the effective range determined at the decision unit;
a deriving unit configured to derive the conversion coefficient on the basis of a difference in the azimuth of the movement direction for the predetermined period, and the integration value of the output values from the angular velocity sensor over the predetermined period as obtained from measurement data measured at the measuring unit when the derivation is determined at the determining unit; and
a delay unit configured to control an output timing of an output value from the angular velocity sensor to match with a measurement timing of measurement data at the measuring unit, the delay unit configured to output the output value of the controlled angular velocity sensor to the determining unit and the deriving unit.

7. The navigation apparatus according to claim 6, wherein the decision unit determines an effective range as the moving velocity decreases.

8. A method for deriving a conversion coefficient, the method comprising:
periodically measuring measurement data using a measuring unit, the measurement data including at least an azimuth of a movement direction and a movement velocity of a moving body on the basis of a signal received from a satellite;
controlling an output timing of an output value from an angular velocity sensor to match with a measurement timing of measurement data;
determining, using hardware or using hardware and software, an effective range for an integration value of output values from the angular velocity sensor over a predetermined period on the basis of the movement velocity of measured measurement data;

determining suspense of deriving of a conversion coefficient to determine whether to derive the conversion coefficient when the integration value of the output values from the controlled angular velocity sensor over the predetermined period is not included in the determined effective range; and deriving the conversion coefficient when the derivation is determined, wherein deriving the conversion coefficient is based on a difference in the azimuth of the movement direction for the predetermined period and the integration value of the output values from the controlled angular velocity sensor over the predetermined period as obtained from measured measurement data.

* * * * *